United States Patent
Carr et al.

(10) Patent No.: US 10,030,697 B2
(45) Date of Patent: Jul. 24, 2018

(54) AXIAL BEARING BRIDGE FOR BALL RAMP

(71) Applicant: Schaeffler Technologies AG & Co. KG, Herzogenaurach (DE)

(72) Inventors: Stephen Carr, Waterford, MI (US); Shaun Tate, Grand Blanc, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 84 days.

(21) Appl. No.: 14/706,477

(22) Filed: May 7, 2015

(65) Prior Publication Data
US 2016/0327092 A1   Nov. 10, 2016

(51) Int. Cl.
*F16H 25/12* (2006.01)
*F16C 19/10* (2006.01)

(52) U.S. Cl.
CPC .................................. *F16C 19/10* (2013.01)

(58) Field of Classification Search
CPC ..... F16C 33/3887; F16C 19/10; F16C 33/422
See application file for complete search history.

(56) References Cited

U.S. PATENT DOCUMENTS

| | | | | |
|---|---|---|---|---|
| 3,765,736 A * | 10/1973 | Pitner | ..................... | F16C 19/49 384/455 |
| 3,786,378 A * | 1/1974 | Liguori | .................. | H01P 1/065 333/257 |
| 3,830,553 A * | 8/1974 | Schurger | ................. | D06F 37/00 384/613 |
| 4,042,285 A | 8/1977 | Dorsch | | |
| 4,512,729 A * | 4/1985 | Sakamoto | ............. | F01C 21/003 384/452 |
| 5,106,349 A * | 4/1992 | Botterill | ................ | F16D 43/216 192/93 A |
| 5,160,004 A | 11/1992 | Scott et al. | | |
| 5,252,871 A * | 10/1993 | Inoue | ...................... | F16C 19/10 310/268 |
| 5,445,456 A * | 8/1995 | Isoda | ...................... | F16C 21/00 384/126 |
| 5,484,033 A | 1/1996 | Frank et al. | | |
| 5,720,689 A * | 2/1998 | Imanishi | ................. | F16C 19/30 384/455 |
| 5,823,911 A * | 10/1998 | Hibi | ........................ | F16H 15/38 476/40 |
| 5,830,103 A * | 11/1998 | Itoh | ........................ | F16H 15/38 476/40 |
| 6,332,858 B1 * | 12/2001 | Mori | ...................... | F16H 15/38 384/612 |

(Continued)

FOREIGN PATENT DOCUMENTS

DE   102004017342 A1   11/2004
DE   102006025060 A1   12/2007

(Continued)

*Primary Examiner* — Zakaria Elahmadi
(74) *Attorney, Agent, or Firm* — Volpe and Koenig, P.C.

(57) ABSTRACT

A ball ramp plate and a ball ramp assembly including the ball ramp plate are provided. The ball ramp plate comprises a stamped metal plate formed with ramped ball pockets on a first side at a ball ramp pitch radius and a thrust bearing support on a second side of the plate. The thrust bearing support has a first support surface at a first pitch radius greater than the ball ramp pitch radius and a second support surface at a second pitch radius less than the ball ramp pitch radius.

10 Claims, 4 Drawing Sheets

(56) References Cited

U.S. PATENT DOCUMENTS

| | | | |
|---|---|---|---|
| 6,561,332 B2 | 5/2003 | Organek et al. | |
| 6,578,693 B2 | 6/2003 | Mayr | |
| 6,651,793 B2 | 11/2003 | Reisinger | |
| 6,828,708 B2 * | 12/2004 | Ito | H02K 7/085 310/254.1 |
| 7,000,492 B2 | 2/2006 | Hulsebusch et al. | |
| 7,717,818 B2 * | 5/2010 | Suzuki | F16H 48/10 475/150 |
| 7,806,797 B2 | 10/2010 | Gassmann et al. | |
| 8,021,131 B2 * | 9/2011 | Schooling | F04D 19/042 384/453 |
| 9,222,525 B2 * | 12/2015 | Yamamoto | F16D 23/12 |
| 9,377,060 B1 * | 6/2016 | Pritchard | F16D 28/00 |
| 2001/0011622 A1 * | 8/2001 | Arai | B60K 17/3505 192/35 |
| 2001/0047919 A1 * | 12/2001 | Mayr | F16D 13/52 192/93 A |
| 2003/0015385 A1 * | 1/2003 | Ishikawa | F16D 25/123 192/35 |
| 2004/0194252 A1 * | 10/2004 | Sorensen | B60B 33/0002 16/48 |
| 2006/0011441 A1 * | 1/2006 | Showalter | B60K 17/3467 192/84.6 |
| 2006/0182380 A1 * | 8/2006 | Tada | F16C 19/10 384/609 |
| 2006/0245823 A1 * | 11/2006 | Chludek | F16D 28/00 403/322.3 |
| 2007/0105684 A1 * | 5/2007 | Gassmann | F16D 28/00 475/249 |
| 2010/0089199 A1 | 4/2010 | Lafer et al. | |
| 2010/0300827 A1 * | 12/2010 | Jurjanz | F16D 23/12 192/31 |
| 2012/0008894 A1 * | 1/2012 | Plasse | B29C 47/0803 384/608 |
| 2012/0020606 A1 * | 1/2012 | Montboeuf | B60G 15/068 384/607 |
| 2014/0348454 A1 * | 11/2014 | Ueno | F16C 33/3875 384/480 |

FOREIGN PATENT DOCUMENTS

| | | | | |
|---|---|---|---|---|
| DE | 102011083047 | * | 1/2012 | F16H 25/12 |
| DE | 102011083047 A1 | | 3/2013 | |
| DE | 102012202456 A1 | | 8/2013 | |
| EP | 0989318 A2 | | 3/2000 | |
| EP | 2024668 B1 | | 6/2014 | |
| WO | 2007138003 A1 | | 12/2007 | |

* cited by examiner

AXIAL BEARING BRIDGE FOR BALL RAMP

FIELD OF INVENTION

The present invention generally relates to a power transmission apparatus; more specifically to a ball ramp bridge for axial actuation in disconnect systems.

BACKGROUND

In efforts to save space and weight in power split transmissions, some ball ramps have been made of formed sheet steel. Ball ramps typically experience axial loads which can deform sheet steel ramps. Axial support is therefore needed in the form of an axial or thrust bearing.

Sheet steel ball ramps typically do not provide a suitable bearing support surface for the applied axial load. Current solutions include using a U-shaped bridge adjacent to the ball ramp to act as a bearing surface which requires increased axial space or using an axial bearing at a different pitch radius than the ball ramp which leads to uneven loading.

Accordingly, a need exists for a ball ramp that overcomes the deficiencies of current ball ramps.

SUMMARY

Embodiments of a ball ramp plate and a ball ramp assembly including the ball ramp plate are provided herein. In a non-limiting embodiment, a ball ramp plate comprises a plate with ramped ball pockets formed on a first side at a ball ramp pitch radius and a thrust bearing support on a second side of the plate. The thrust bearing support has a first support surface at a first pitch radius greater than the ball ramp pitch radius and a second support surface at a second pitch radius less than the ball ramp pitch radius. The first and second support surfaces are integrally formed with the plate.

In a non-limiting embodiment, a ball ramp assembly comprises a dynamic ball ramp plate with ramped first ball pockets formed on a first side of the plate at a ball ramp pitch radius and a thrust bearing support on a second side of the plate. The assembly further comprises a static ball ramp plate with ramped second ball pockets corresponding in number with the first ball pockets, the static ball ramp plate and the dynamic ball ramp plate coaxially aligned so that the first and second ball pockets are opposed. A plurality of rolling elements is disposed in the opposing first and second ball pockets. A first thrust bearing is disposed on a first support surface of the thrust bearing support at a first pitch radius greater than the ball ramp pitch radius and a second thrust bearing is disposed on a second support surface of the thrust bearing support at a second pitch radius less than the ball ramp pitch radius.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
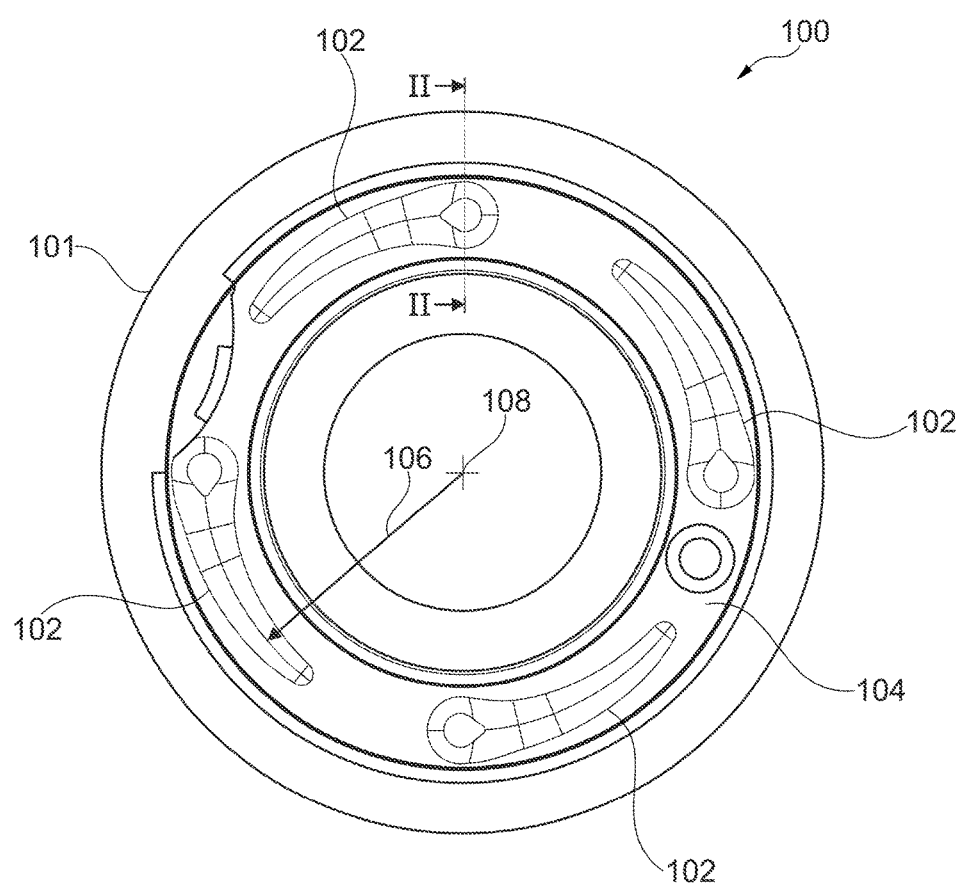
FIG. 1 is an axial view of a first side of a ball ramp plate in accordance with an embodiment of the invention.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
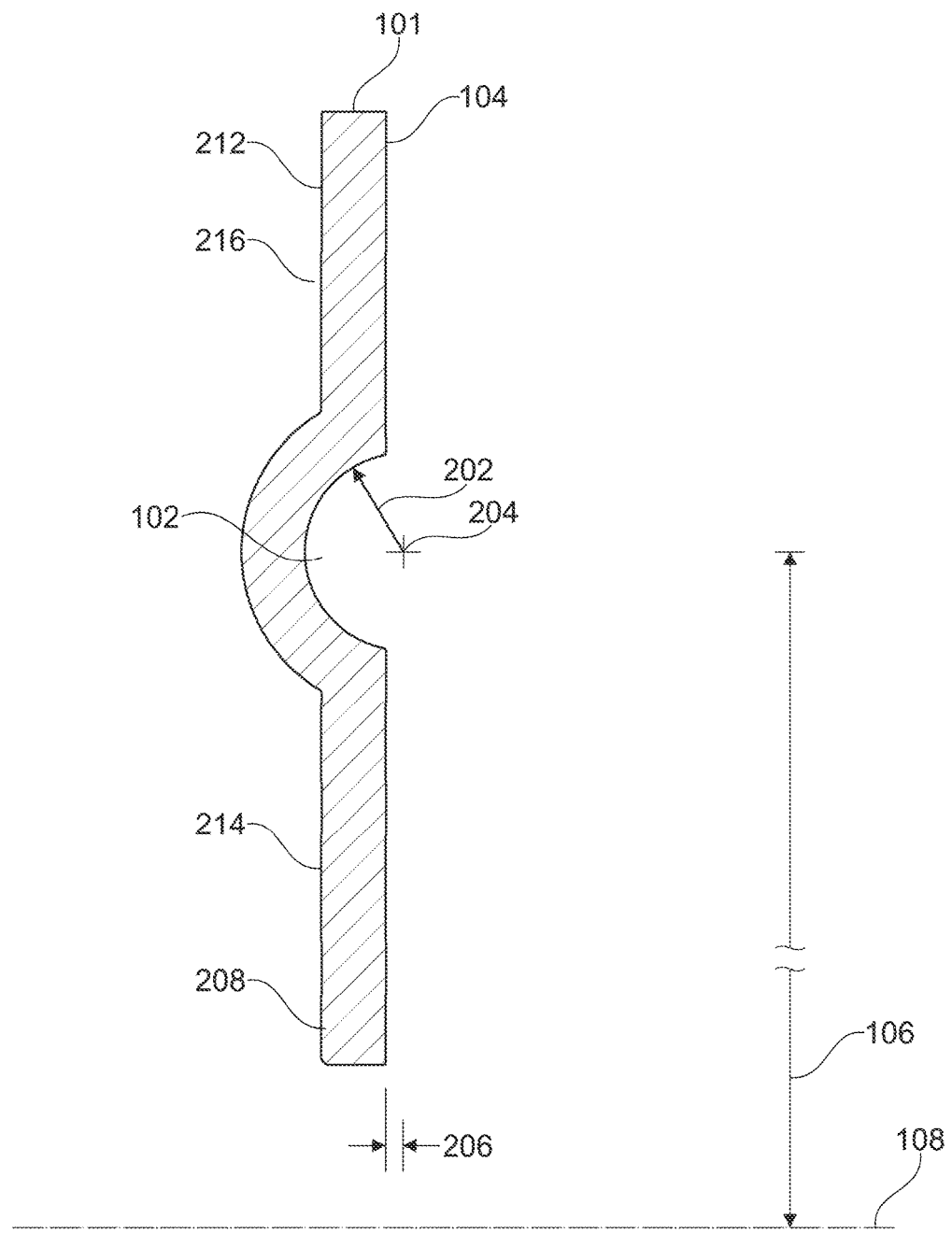
FIG. 2 is a sectional view of the ball ramp plate of FIG. 1 taken along II-II.

FIG. 1 depicts an axial view of a first side of ball ramp plate 100 in accordance with a non-limiting embodiment of the disclosure. As illustrated, the ball ramp plate 100 includes an annular plate 101 formed with four ramped ball pockets 102 formed in the first face 104, although a greater number or lesser number of ball pockets could also be used. In some cases, the first face is referred to as the wheel side of the ball ramp plate 100. Each ball pocket 102 is formed with a ramped bottom surface so that the depth decreases in the counter clockwise direction as drawn. The ball pockets 102 have a constant radius 202 (FIG. 2) with the center 204 of the radius on the ball ramp pitch radius 106 measured from the axis 108. Therefore, the ramped ball pockets 102 are symmetrically formed with respect to the ball ramp pitch radius 106 about the axis 108. For each ball pocket 102, the distance 206 between the center 204 of the radius 202 and the first surface 104 increases in the counter clockwise direction as drawn, forming the ramped bottom surface. Alternately, the ball pockets 102 can be formed with a ramped bottom surface that increases in the counter clockwise direction as drawn.

A thrust bearing support 208 is on the second face 216, sometimes referred to as the differential side of the ball ramp plate 100. In the preferred embodiment illustrated, the thrust bearing support 208 is integrally formed with the plate 101. The thrust bearing support 208 includes a first support surface 212 and a second support surface 214. The first support surface 212 is radially outward of the ball ramp pitch radius 106 and the second support surface 214 is radially inward of the ball ramp pitch radius 106. In the preferred embodiment illustrated, the first and second support surfaces 212, 214 are coplanar.

In a non-limiting embodiment, the plate 101 is formed from a plate by a shaping method that does not remove material from the plate in the form of chips. In a preferred embodiment, the ramp 101 is a stamped metal plate, which may be formed in a single- or multi-step stamping operation. Suitable material for the plate 101 include chromium steel (i.e., a corrosion-resistant steel containing chromium), for example AISI 5120.

Figure 3:
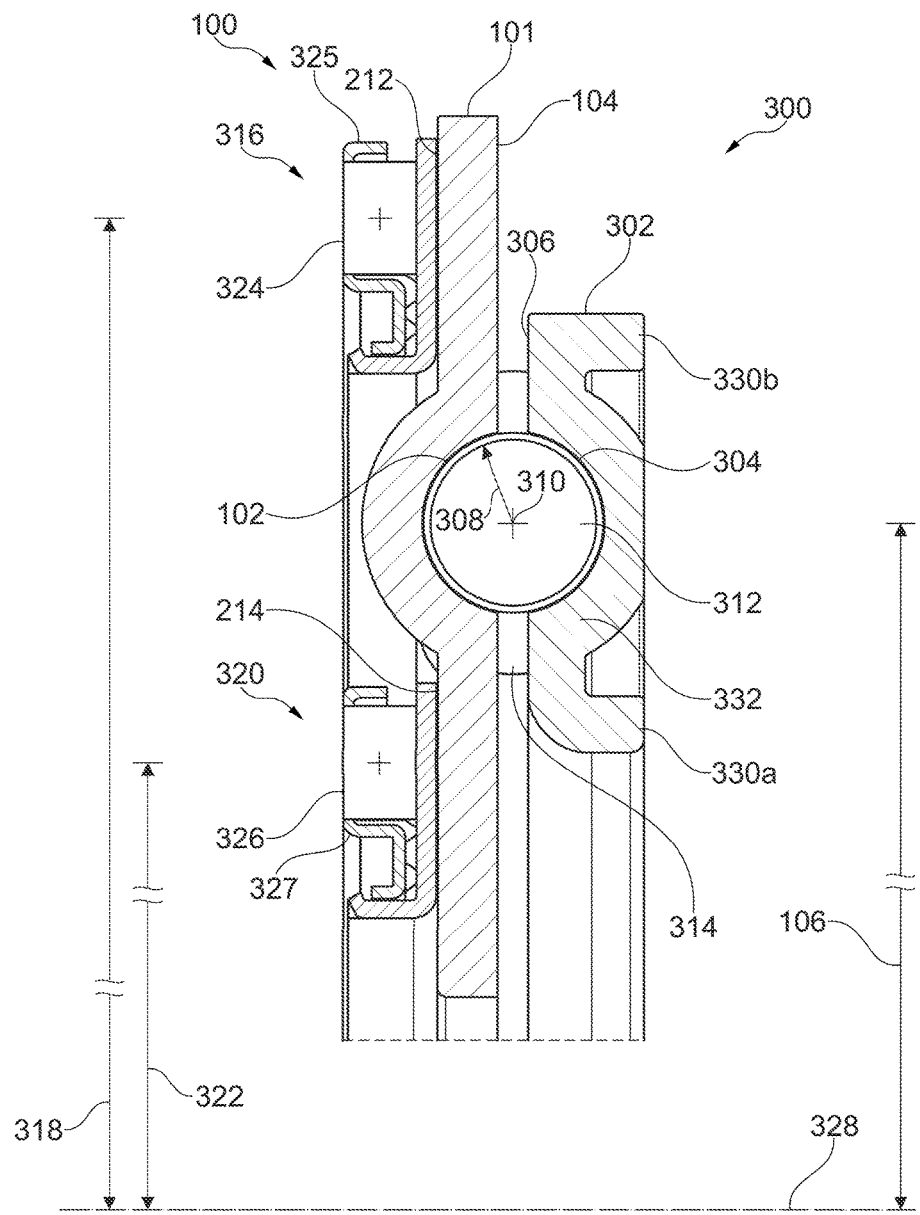
FIG. 3 is a side sectional view of a portion of a ball ramp assembly in accordance with an embodiment of the invention.

In a non-limiting embodiment illustrated in FIG. 3, a ball ramp assembly 300 includes the ball ramp plate 100 as a dynamic ramp plate and a static ramp plate 302. The static ramp plate 302 is of similar, or substantially similar, configuration as the plate 101. As such, the static ramp plate 302 is a generally annular plate with ramped ball pockets 304 formed in the second surface 306, with the ball pockets 304 corresponding with the ball pockets 102 in number and pitch diameter 106. Each ball pocket 304 is formed in the same configuration as ball pockets 102 with corresponding dimensions. Thus, in the illustrated embodiment, the ball pockets 304 are formed so that the depth decreases in the counter clockwise direction when the second surface 306 is viewed along the common axis 328 of the static and dynamic ramp plates 302, 100. Accordingly, ball pockets 304 include a ramped bottom surface so that when the static ramp plate 302 and ball ramp plate 100 are positioned with ball pockets 102 and 304 opposed the bottom surfaces are ramped in opposite directions.

The ball pockets 304 have a constant radius 308, corresponding with radius 202, with the center 310 of the radius on the ball ramp pitch radius 106 so that the ball pockets 304 are symmetrically formed with respect to the ball ramp pitch radius 106 and are similarly shaped and positioned as the ball ramp pockets 102. When assembled as illustrated in FIG. 3, center 204 and center 310 are concentric.

Rolling elements, balls 312, are disposed between the ball ramp plate 100 and the static ramp plate 302 contained in at least some of the opposing ball pockets 102, 304 which are concentric when ball ramp plates 100 and 302 are assembled as illustrated. A ball cage 314 may be provided to guide balls 312.

A first thrust bearing 316 is disposed on the first support surface 212 so that the first pitch radius 318 is greater than the ball pitch radius 106. A second thrust bearing 320 is disposed on the second support surface 214 so that the second pitch radius 322 is less than the ball pitch radius 106.

In the non-limiting embodiment illustrated in FIG. 3, first and second thrust bearings 316, 320 are needle bearings provided with cylindrical rolling elements 324, 326, respectively. For the needle bearings illustrated, the pitch radius is measured from the common axis 328 of the assembly 300 to the longitudinal midpoint of the rolling elements 324, 326. In embodiments using spherical rolling elements, the pitch radius is measured to the center of the rolling element.

In some embodiments, the thrust bearings 316, 320 include bearing cages 325, 327, respectively, to guide and maintain the position of the rolling elements, for example 324, 326.

As illustrated in the non-limiting embodiment of FIG. 3, the cross section of static ramp plate 302 is formed with generally parallel end walls 330a and 330b joined by wall 332 generally perpendicular to the end walls. Wall 332 includes second surface 306 in which the ball pockets 304 are formed. Other configurations for the cross section are contemplated. In a preferred embodiment, the static ramp plate 302 is formed using the same process or processes used to form the plate 101, and may be made from the same material materials found suitable for the plate 101. The static ramp plate is preferably formed by a shaping method that does not remove material from the plate in the form of chips. Preferably, the ramp 101 is a stamped metal plate, which may be formed in a single- or multi-step stamping operation.

Figure 4:
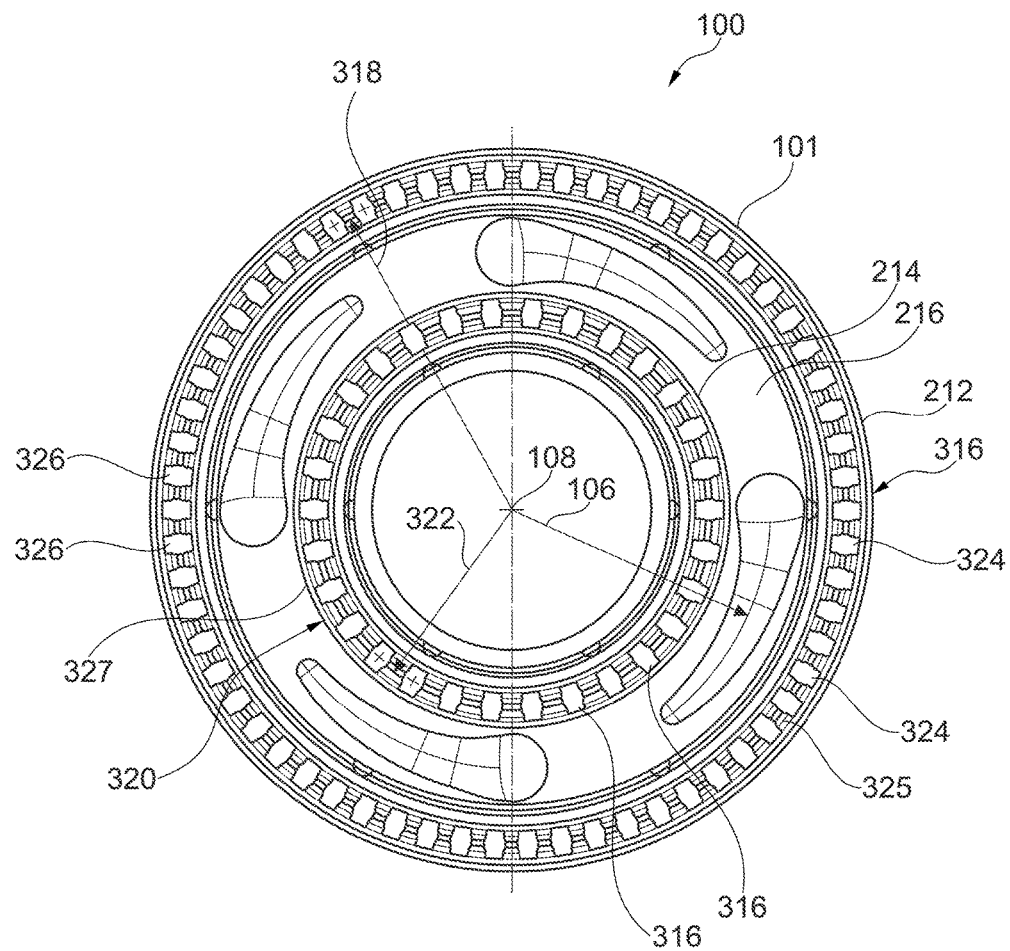
FIG. 4 is an axial view of a second side of the ball ramp of FIG. 1

FIG. 4 is an axial view of a non-limiting embodiment of the ball ramp plate 100 of the second face 216. As illustrated, the first thrust bearing 316 is disposed on the first support surface 212 of second face 216 concentric with the plate 101 about axis 108. The cylindrical rolling elements 324 are positioned so that the longitudinal centers lie at a pitch radius 318 greater that the ball pitch radius 106. The second thrust bearing 320 is disposed on the second support surface 214 of the second face 216, radially inward of the first thrust bearing 316 and concentric with the first thrust bearing 316 and the plate 101. The cylindrical rolling elements 316 are positioned so that the longitudinal centers lie at a pitch radius 322 less than the ball pitch radius 106.

Thus a ball ramp plate and a ball ramp assembly including the plate are provided herein. The disclosed ball ramp assembly provides two rolling elements to support an axial load applied to the ball ramp assembly. Advantageously the two rolling elements, for example needle rollers, share the axial load and therefore, each rolling element can be a lower capacity needle over ball ramp assemblies using ball ramp plates with a single needle roller. The reduced capacity rollers can be shorter in length or smaller in diameter, or both, compared to the needle in single roller systems. The reduced roller dimensions may beneficially reduce axial length of the assembly over single roller systems. Using two axial bearings, one with a pitch radius greater than the ball pitch radius and one less than the ball pitch radius eliminates, or substantially reduces, the bending moment developed with one roller at a pitch radius greater or less than the ball pitch radius. Accordingly, the disclosed ball ramp plate and ball ramp assembly may advantageously reduce the space requirements over known systems.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A ball ramp plate comprising:
   a plate with ramped ball pockets formed on a first side at a ball ramp pitch radius; and
   a thrust bearing support on a second side of the plate having a first support surface that is planar and defined on the second side of the plate at a first pitch radius greater than the ball ramp pitch radius and a second support surface that is planar and defined on the second side of the plate at a second pitch radius less than the ball ramp pitch radius, and the first support surface is spaced radially outward and away from the ramped ball pockets, and the second support surface is spaced radially inward and away from the ramped ball pockets,
   wherein the first support surface and the second support surface are integrally formed with the plate, the first support surface and the second support surface are coplanar, and the first support surface is configured to support a first thrust bearing and the second support surface is configured to support a second thrust bearing.

2. The ball ramp plate of claim 1, wherein the plate is a stamped metal plate.

3. The ball ramp plate of claim 1, wherein the plate is formed from chromium steel.

4. A ball ramp assembly comprising:
a dynamic ball ramp plate with ramped first ball pockets formed on a first side of the plate at a ball ramp pitch radius and a thrust bearing support on a second side of the plate;
a static ball ramp plate with ramped second ball pockets corresponding in number with the first ball pockets, the static ball ramp plate and the dynamic ball ramp plate coaxially aligned so that the first and second ball pockets are opposed;
a plurality of rolling elements disposed in the opposing first and second ball pockets;
a first thrust bearing disposed on a first support surface of the thrust bearing support at a first pitch radius greater than the ball ramp pitch radius; and
a second thrust bearing disposed on a second support surface of the thrust bearing support at a second pitch radius less than the ball ramp pitch radius,
wherein the first support surface is a planar surface and defined on the second side of the plate spaced radially outward and away from the ramped first ball pockets, and the second support surface is a planar surface and defined on the second side of the plate spaced radially inward and away from the ramped first ball pockets, and the first support surface and the second support surface are coplanar.

5. The ball ramp assembly of claim 4, wherein the dynamic ball ramp plate is a stamped metal plate.

6. The ball ramp assembly of claim 4, wherein the static ball ramp plate is a stamped metal plate.

7. The ball ramp plate assembly of claim 4, wherein the dynamic ball ramp plate and the static ball ramp plate are formed from chromium steel.

8. The ball ramp assembly of claim 4, wherein the first support surface and the second support surface are integrally formed with the plate.

9. The ball ramp assembly of claim 4, wherein the first thrust bearing comprises rolling elements disposed in a first bearing cage.

10. The ball ramp assembly of claim 4, wherein the second thrust bearing comprises rolling elements disposed in a second bearing cage.

* * * * *